United States Patent [19]

Blatz

[11] Patent Number: 4,952,628

[45] Date of Patent: Aug. 28, 1990

[54] BARRIER BLENDS BASED ON AMORPHOUS POLYAMIDE AND ETHYLENE/VINYL ALCOHOL, UNAFFECTED BY HUMIDITY

[75] Inventor: Philip S. Blatz, Wilmington, Del.

[73] Assignee: E. I. du Pont de Nemours and Company, Wilmington, Del.

[21] Appl. No.: 206,025

[22] Filed: Jun. 17, 1988

Related U.S. Application Data

[63] Continuation-in-part of Ser. No. 88,260, Aug. 24, 1987, abandoned.

[51] Int. Cl.[5] .......................... C08L 29/02; C08F 16/06
[52] U.S. Cl. ........................................ 525/58; 525/56; 525/933
[58] Field of Search ............................ 525/58, 933, 56

[56] References Cited

U.S. PATENT DOCUMENTS

| | | | |
|---|---|---|---|
| 3,726,945 | 4/1973 | Bottenbruch et al. | 260/8.57 |
| 4,079,850 | 3/1978 | Suzuki et al. | 215/1 C |
| 4,420,516 | 12/1983 | Ermert et al. | 428/35 |
| 4,427,825 | 1/1984 | Degrassi et al. | 525/56 |
| 4,468,427 | 8/1984 | Degrassi et al. | 428/220 |
| 4,500,677 | 2/1985 | Maruhashi et al. | 525/57 |
| 4,501,797 | 2/1985 | Super et al. | 428/349 |
| 4,501,798 | 2/1985 | Koschak et al. | 428/349 |
| 4,551,366 | 11/1985 | Maruhashi et al. | 428/35 |
| 4,562,118 | 12/1985 | Maruhashi et al. | 428/412 |

FOREIGN PATENT DOCUMENTS

| | | |
|---|---|---|
| 0044484 | 1/1982 | European Pat. Off. . |
| 0132565 | 2/1985 | European Pat. Off. . |
| 0214724 | 3/1987 | European Pat. Off. . |
| 53-49050 | 5/1978 | Japan . |
| 59-216536 | 12/1984 | Japan . |

OTHER PUBLICATIONS

Selar PA High Barrier Nylons: The Next Generation of Barrier Packaging Resins by P. S. Blatz, Dec. 3, 1986.
Chemical Abstracts No. 84:32124U (Jap. Kokai 75,121,347 Publ. 9/23/75).

*Primary Examiner*—Ana L. Carrillo

[57] ABSTRACT

A blend consisting essentially of a major portion of an amorphous polyamide and a minor portion of an ethylene vinyl alcohol copolymer exhibits gas barrier properties which are less dependent on humidity than are those of either of the component polymers. Films and laminated structures which incorporate the material of these blends are suitable for use as packaging materials.

14 Claims, No Drawings

BARRIER BLENDS BASED ON AMORPHOUS POLYAMIDE AND ETHYLENE/VINYL ALCOHOL, UNAFFECTED BY HUMIDITY

BACKGROUND OF THE INVENTION

This application is a continuation-in-part of U.S. Ser. No. 088,260, filed Aug. 24, 1987 now abandoned.

This invention relates to blends of amorphous polyamide with a minor amount of vinyl alcohol polymer, having oxygen barrier properties which are relatively independent of humidity, and packaging films, laminates, and containers prepared therefrom.

Blends of ethylene vinyl alcohol ("EVOH") polymers with polyamides in general are known, and have been used in packaging applications as barriers to inhibit the passage of atmospheric oxygen or other gases.

Japanese patent application No. 53-49050 discloses a blend of ethylene vinyl alcohol copolymer (EVOH) with 5 to 40 weight percent polyamide. The EVOH contains 20-50 mole percent copolymerized ethylene, and is saponified at least 90%. The polyamides disclosed include a copolymer of hexamethylene diamine with isophthalic and terephthalic acids, in mole ratios of 100/0 to 50/50. The blend is formed into a film, which possesses gas barrier properties. The barrier performance of the film is purported not to decline even in highly humid atmospheres.

U.S. Pat. No. 3,726,034, Bottenbruch et al., discloses mixtures of 70-99% polyamide and up to 30% of a hydroxyl containing polyolefin. The polyamides "consist of linear unbranched polymer chains containing no additional functional groups." Exemplified are blends of nylon 6 and EVOH.

U.S. Pat. No. 4,079,850, Suzuki et al., discloses a multi-layer blow molded container, which contains a layer which may be EVOH, polyamide, or various blends, providing gas barrier properties. The polyamides which are mentioned are nylon 6, nylon 66, and nylon 2.

U.S. Pat. No. 4,427,825, Degrassi et al., discloses a composition of matter useful for making films, of polyamide and 1-65% EVOH. Nylons with melting points greater than 175° C. are preferred, such as nylon 11 or nylon 12.

U.S. Pat. No. 4,500,677, Maruhashi et al., discloses a resin composition comprising a mixture of two EVOH resins and a polyamide resin. The ratio of the EVOH resins to the nylon resin can be between 95:5 and 5:95. Nylon 6, nylon 6,6 and other polyamides having "linear alkylene group[s]" are specifically mentioned.

BRIEF SUMMARY OF THE INVENTION

According to this invention there is now provided a blend consisting essentially of about 50 to about 95 weight percent of an amorphous polyamide having a glass transition temperature of about 90° C. to about 200° C.; and about 5 to about 50 weight percent of a vinyl alcohol polymer having a copolymerized ethylene content of 0 to about 60 mol percent and a degree of saponification of at least about 90%, the percentages of the polyamide and vinyl alcohol polymers being based on the total weight of polymers in the blend. Further provided are monolayer or multiple layer films prepared from these blends. Further provided are laminates comprising a layer of amorphous polyamide and a layer of vinyl alcohol polymer. Finally, the present invention provides packaging materials prepared from these blends, films, or laminated structures.

DETAILED DESCRIPTION OF THE INVENTION

Films and compositions with barrier properties are important in many applications. Of particular interest are films which are barriers to the penetration of gases, such as oxygen, carbon dioxide, and various aromas.

EVOH copolymers have barrier properties which, although exceptional under low humidity conditions, degrade with increasing humidity. This increase in permeability with humidity is also typical of most semicrystalline polyamides. Certain amorphous polyamides, on the other hand, have gas barrier properties which improve as the humidity increases. We have found that compositions containing both resins, with the EVOH as a minor component, have barrier properties which are less affected by humidity than are either of the individual resins.

The term "amorphous polyamide" is well known to those skilled in the art, and refers to polymers distinct from the crystalline or semicrystalline nylons. Nylons 6, 9, 11, and 12, for example, are crystalline polymers and have readily determined crystalline melting points. It is true, of course, that such semicrystalline nylons may also have amorphous regions, and may even have measurable glass transition temperatures. But they are not thereby included in this invention. As used herein, "amorphous polyamide" refers to those polyamides which are lacking in crystallinity as shown by the lack of an endotherm crystalline melting peak in a Differential Scanning Calorimeter (DSC) test (ASTM D-3417).

Examples of the polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

The diamines and diacids mentioned above can be combined as desired, provided the resulting polyamide is amorphous and, further, that its oxygen barrier properties improve with increasing humidity. That is, an aliphatic diamine can generally be combined with an aromatic diacid, or an aromatic diacid can generally be combined with an aliphatic diacid to give suitable amorphous polyamides.

However, not all of these aromatic/aliphatic combinations will necessarily be suitable. For example, specifically metaxylylenediamine adipamide is not generally suitable for this invention. This material has a relatively low Tg of about 85° C. when dry. In the presence of humidity the Tg decreases and the polymer readily crystallizes. This polymer also readily crystallizes upon orienting. This illustrates the fact that it is important to determine that a particular polyamide is amorphous and has a Tg of at least about 90° C., as described below, and not to rely blindly on the chemical structure of the polymer. This determination can easily be done by DSC.

Polyamides prepared from aliphatic diamines with aliphatic diacids are the traditional semicrystalline nylons and are therefore not a part of this invention. Polyamides prepared from aromatic diamines and aromatic diacids are also known. However, certain of these all-aromatic polyamides are known to be intractable under ordinary melt processing conditions, and thus are not normally suitable. Thus the preferred amorphous polyamides are those in which either the diamine or the diacid moiety is aromatic, and the other moiety is aliphatic. The aliphatic groups of these polyamides preferably contain 4–8 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

Specific examples of polyamides which are suitable for this invention include: hexamethylenediamine isophthalamide, hexamethylenediamine isophthalamide/-terephthalamide copolymer, having isophthalic/terephthalic moiety ratios of 100/0 to 60/40, mixtures of of 2,2,4- and 2,4,4-trimethylhexamethylenediamine terephthalamide, copolymers of hexamethylene diamine and 2-methylpentamethylenediame with iso- or terephthalic acids, or mixtures of these acids. Polyamides based on hexamethylendiamine iso/terephthalamide containing high levels of terephthalic acid may also be useful provided a second diamine such as 2-methyldiaminopentane is incorporated to produce a processible amorphous polymer. (As used herein, the term "copolymer" includes within its meaning terpolymers and higher polymers, which is common usage.)

The above amorphous polyamides may contain as comonomers minor amounts of lactam species such as caprolactam or lauryl lactam, or metaxylylene diamine, or other aliphatic or aromatic dicarboxylic acids or diamines, even though polymers based on these monomers alone may show deterioration in barrier properties with increasing humidity. The important feature is that the polyamide composition as a whole must show improved barrier performance with increased humidity. Thus small amounts of these comonomers may be incorporated as long as they do not substantially diminish this property of the polyamide. Similarly, small amounts of semicrystalline polyamides such as nylon 6, nylon 66, and their copolymers, or metaxylylene diamine adipamide, or of other polymers such as polyesters, polyethers, polyolefins, and the like, may be included with the amorphous polyamide, provided only that the polyamide as a whole shows the desired improvement in barrier property with increasing humidity.

The most preferred polymers are the polyamide prepared from hexamethylenediamine and iso- and terephthalic acid having isophthalic/terephthalic moiety ratios of 100/0 to 60/40; and the copolymers of hexamethylenediamine, 2-methylpentamethylenediamine and iso- and terephthalic acids having isophthalic/terephthalic moiety ratios of 100/0 to 15/85.

The amorphous polyamides suitable for this invention, more specifically, are amorphous polyamides which have a high glass transition temperature (Tg). By a high glass transition temperature is meant a Tg which is significantly above the ordinary use temperatures of gas barrier material, that is, significantly above room temperature. For most applications the Tg of the amorphous polyamide (as measured in the dry state, i.e., containing about 0.12 weight % moisture or less) should be in the range of about 90° C. to about 200° C., and preferably about 100° C. to about 165° C.

While not wishing to be bound by any particular theory, it is believed the permeation of gas through polyamides occurs through the amorphous regions of a polymer. Furthermore, the particular permeation characteristics of a polyamide are strongly influenced by the Tg of its amorphous regions. The amorphous regions of ordinary, aliphatic, highly crystalline polyamides exhibit Tgs in the range of 60° C. to 80 C. when dry, depending on the chemical structure of the polymer. The Tgs are even significantly lower at high humidities. These polymers have barrier properties which deteriorate at high humidity. Amorphous polyamides, as described above, normally have Tgs of around 125° C. when dry, diminishing somewhat with increasing humidity. It is believed that the high Tg of the amorphous polyamides is related to their unusual gas permeation behavior of becoming better barriers with increasing humidity. The lower limit on Tg is not clearly demarked. It must simply be sufficiently far above room temperature that the polyamide shows improved gas barrier properties with increasing humidity. Thus 90° C. is an approximate lower limit. The upper limit on the Tg is likewise not clearly demarked. But amorphous polyamides with Tg above about 200° C. are not as readily melt processable. Thus all-aromatic polyamides, having aromatic groups in both acid and amine moieties, tend to have a Tg which is too high to permit melt processing, and are thus normally unsuitable for the purposes of this invention.

The molecular weight of the polyamides is not particularly limited, but it should be that necessary to give the polymer the strength and toughness required for commercial utility. The inherent viscosity, IV, as measured using a solution of 0.5 g of polymer in 100 mL of m-cresol at 23° C. will preferably be in the range of 0.70 to 0.95.

The density of the polyamide is also a consideration, since the higher the density of the amorphous areas of the polymer, the better will be the barrier properties. The amorphous polyamides of this invention generally have a density of 1.7 to 1.19 g/cm$^3$, but compositions containing minor amounts of other polyamides may have higher or lower densities.

The amorphous polyamides of the present invention are prepared by condensation polymerization, which is well known to those skilled in the art.

The vinyl alcohol resins useful in this invention include resins having a copolymerized ethylene content of about 0 to about 60 mole %, preferably about 20 to about 60 mole %, and especially about 25 to about 50 mole %. Copolymers of less than about 15 to 20 mole % ethylene tend to be difficult to extrude without plasticizer, while those above about 60 or 65 mole % ethylene have reduced oxygen barrier performance. These polymers will have a saponification degree of at least about 90%, especially at least about 95%. The vinyl alcohol polymer may include as a comonomer other olefins such as propylene, butene-1, pentene-1, or 4-methylenpentene-1 in such an amount as to not change the barrier properties of the copolymer, that is, in an amount of up to about 5 mole % based on the total copolymer. It is generally observed that the higher the vinyl alcohol content of the resin, the better the barrier properties at low humidities, but the poorer the barrier properties at high humidities. The melting points of ethylene vinyl alcohol polymers having at least about 20 mol % copolymerized ethylene are generally between about 160° and 190° C.

Ethylene vinyl alcohol polymers are normally prepared by copolymerization of ethylene with vinyl acetate, followed by hydrolysis of the vinyl acetate component to give the vinyl alcohol group. This process is well known in the art.

In addition to ethylene vinyl alcohol copolymers, polyvinyl alcohol (PVOH) itself may sometimes advantageously be used. In order to be melt processable, PVOH must be suitably plasticized, for example, with a plasticizer selected from the group of ethylene glycol, diethylene glycol, triethylene glycol, polyethylene glycol, glycerol, pentaerythritol, and the like. Use of about 3 to 11 percent triethylene glycol, based on the weight of the PVOH, has given suitable results. Use of too little plasticizer does not provide melt processability; use of too much results in deterioration of physical properties, including barrier properties. (As used herein, the term "EVOH" generally includes PVOH.)

The blends which are a subject of the invention contain a major amount of the amorphous polyamide described above, to form a continuous phase, and a minor amount of the EVOH polymer. Normally about 5% to about 50% EVOH will be blended with the amorphous polyamide. Below about 5% EVOH there is no significant change in the properties compared with the neat polyamide; above about 50% EVOH the properties of the blend are similar to those of neat EVOH. Preferably about 20-45%, and most preferably about 25-40% EVOH will be used. In this most preferred range, there is little or no change in barrier properties of the blend as the humidity changes. Additional minor amounts of other conventionally used additives such as fillers or other materials may additionally be present.

Addition of mica to the composition has been found to be unusually advantageous, providing a significant reduction in the permeability of the blend. The composition may advantageously contain up to about 20 weight percent or more mica, although at higher levels difficulties in processing may arise, depending on the particular equipment used. A preferred amount of mica is about 13 to about 23 percent by weight. The mica used may be, for example, Muscovite mica, $KAl_2(AlSi_3O_{10})$, or Phlogopite mica, $KMg_3(AlSi_3O_{10})(OH)_2$. Muscovite mica is preferred, since it is generally composed of platelets having a higher aspect ratio. The platelet size of the mica should be small in order to achieve uniform distribution within the blend. Ninety-five percent of the particles should be smaller than 200 mesh (74 micrometers) and preferably at least 90% smaller than 325 mesh (44 micrometers) and most preferably, 99.5% smaller than 400 mesh (38 micrometers). The aspect ratio, which is the weight averaged ratio of the equivalent disk diameter to the thickness, can be from 10 to 150, with the preferred range being 20 to 150. It is believed that the improvement in OPV is due to the plate-like structure of the mica, which permits it to effectively form a tortuous path barrier to diffusion of materials through the polymer matrix. For this reason other plate- or flake-like materials, such as aluminum flake, should provide comparable improvement in OPV provided they have similar physical dimensions.

The invention provides a melt blend of the two resins, which may be formed into a film. The melt blending and film formation may be done on conventional equipment.

Alternatively, the invention can be a laminate of at least two layers, one of which is substantially amorphous polyamide, and one of which is substantially EVOH. This layered or laminar structure can be produced by any suitable method such as lamination of the films of the two components, or coextrusion of the resins using readily available equipment. The lamination can be by either a batch or continuous process, and the coextrusion can be achieved using continuous processes such as those used to produce multilayer sheet or film using a flat single or multimanifold extrusion die and feed block system. A multilayer structure can also be produced using a circular die to produce blown multilayer film. For some applications it may be advantageous to use a laminated structure in which there are at least two layers, both of which consist essentially of a blend of amorphous polyamide and EVOH, but in different proportions. At least one layer may be mostly amorphous polyamide with a minor amount of EVOH, and at least one layer may be mostly EVOH, with a minor amount of amorphous polyamide.

In any of the above described laminates or multilayer structures, the relative amounts of the two components must be correctly selected in order to provide a structure with the proper barrier properties. In an analogous fashion to the simple blends, such multilayer structures should comprise 5–50 weight % EVOH and 50–95 weight % amorphous polyamide, based on the total of EVOH and amorphous polyamide. Preferably there will be 10–45 weight % EVOH and 55–90 weight % amorphous polyamide, and most preferably 25–40 weight % EVOH and 60–75 weight % amorphous polyamide, based on the total of EVOH and amorphous polyamide. For laminates consisting of layers of unmixed amorphous polyamide and unmixed EVOH, this requirement is approximately equivalent to requiring that the total thickness of the amorphous polyamide layer(s) and the total thickness of the EVOH layer(s) be described by the above percentages. These percentages assume that the layers containing EVOH and amorphous polyamide are substantially uniform in composition, thickness, etc.

These blends, films, and laminated structures are useful in both rigid and flexible packaging applications where barrier properties, that is, the prevention of the passage of molecular oxygen, are important. Specific applications include films, containers, and bottles, which may be made by thermoforming, injection or extrusion blow molding, etc. One particular advantage of the blends of the present invention is that their insensitivity to water permits them to be used in packaging applications without the need for a separate moisture barrier layer.

EXAMPLES

Examples 1–9 and comparative examples C1–C4 are presented in Table I. For each of the examples, blends of amorphous polyamide with EVOH were prepared by melt blending the resins using a batch mixer at 260° C., and then melt pressing into thin films for permeability measurements. In some of the examples a third component, either a small amount of an organo silane or crystalline polyamide, as indicated in Table I, was incorporated into the blend in order to improve compatibility.

The oxygen permeability values ("OPV") of the blends were measured by an "Ox-tran 10–50" oxygen transmission instrument from Modern Controls, Inc., at 30° C., using the method of ASTM D-3985.

The results show that the OPV of the blends are not as greatly affected by changes in humidity as is the OPV of either of the neat components. For example, the OPV of neat amorphous polyamide decreases by a factor of 2.2 upon changing from 0 to 83% relative humidity (comparative examples C1 and C2). At the other extreme, the OPV of neat EVOH increase by a factor of 15.6 upon changing from 0 to 80% relative humidity (comparative examples C3 and C4). Comparative examples C5–C9 show the effect of humidity on oxygen permeability of films of nylon 6 and nylon 66 (The data for comparative examples C5, C7, and C9 is taken from published trade literature for these nylons). In contrast, the OPV of a 70/30 blend of amorphous polyamide and EVOH decreases by a factor of about 1.8 over this range (examples 2 and 3), and a 60/4 blend increases by a factor of about 4.7 (examples 4 and 5). It is seen from this data that for compositions of about 65% polyamide and 35% EVOH the OPV will be essentially constant as humidity changes.

Examples 20 and 21 illustrate laminates which were prepared by melt pressing a film of EVOH between two films of amorphous polyamide. The structure and OPV of the laminates are shown in Table II. It can be seen that, as in the results from Table I, these laminates have suitable OPVs, intermediate between those of the neat components.

TABLE II[1]

| Example | Resins | Structure | Layer Thickness,mil | R.H.,% | OPV |
|---------|--------|-----------|---------------------|--------|-----|
| 20 | polyamide | outside | 2.0 | 79 | 0.28 |
|    | EVOH A | inside | 0.5 | | |
|    | polyamide | outside | 2.0 | | |
| 21 | same composition as example 20 | | | 79 | 0.33 |

[1]Terms have the same meanings as in Table I.

Examples 22–49, presented in Table III, show the effect of additions of mica or talc as a filler. The mica was Muscovite mica of a size suitable to pass 100% through a 325 mesh screen, "Micromesh #3," from Mearl Corporation. The talc was grade MP 12–50, from Pfizer. For these examples, the polyamide was a copolymer of hexamethylenediamine with 30% terephthalic acid and 70% isophthalic acid, IV 0.82, except that for Examples 44 and 45 a comparable polymer of

TABLE I

| Ex. | Polyamide[1]: % | EVOH[2]: Type, | % | Add've[3]: Type, | % | Film Thick. mils[4] | Rel. Hum. % | OPV[5] (30°) |
|-----|-----------------|---------------|----|------------------|----|---------------------|-------------|--------------|
| C1 | 100 | | 0 | | 0 | 1.05 | 0 | 1.34 |
| C2 | 100 | | 0 | | 0 | 1.06 | 83 | 0.61 |
| 1 | 80[6] | A, | 20 | | 0 | 4.30 | 0 | 0.91 |
| 2 | 70 | A, | 30 | | 0 | 3.58 | 80 | 0.66 |
| 3 | 70 | A, | 30 | | 0 | 3.50 | 0 | 1.20 |
| 4 | 60 | A, | 40 | | 0 | 3.27 | 80 | 0.24 |
| 5 | 60 | A, | 40 | | 0 | 3.27 | 0 | 0.051 |
| 6 | 60 | A, | 40 | | 0 | 4.34 | 0 | 0.056 |
| 7 | 79 | A, | 20 | A, | 1 | 2.33 | 81 | 0.48 |
| 8 | 79 | A, | 20 | A, | 1 | 3.70 | 80 | 0.48 |
| 9 | 79 | A, | 20 | A, | 1 | 3.70 | 0 | 0.85 |
| 10 | 69 | A, | 30 | A, | 1 | 1.91 | 81 | 0.37 |
| 11 | 69 | A, | 30 | A, | 1 | 4.15 | 81 | 0.40 |
| 12 | 69 | A, | 30 | A, | 1 | 1.91 | 0 | 0.69 |
| 13 | 69 | A, | 30 | A, | 1 | 4.15 | 0 | 0.62 |
| 14 | 70 | B, | 20 | B, | 10 | 3.68 | 77 | 0.48 |
| 15 | 70 | B, | 20 | B, | 10 | 2.62 | 0 | 0.72 |
| 16 | 60 | B, | 30 | B, | 10 | 2.72 | 77 | 0.35 |
| 17 | 60 | B, | 30 | B, | 10 | 3.84 | 0 | 0.74 |
| 18 | 60 | A, | 30 | B, | 10 | 3.16 | 77 | 0.40 |
| 19 | 60 | A, | 30 | B, | 10 | 4.15 | 0 | 0.76 |
| C3 | 0 | A, | 100 | | 0 | 0.56 | 0 | 0.005 |
| C4 | 0 | A, | 100 | | 0 | 0.56 | 80 | 0.080 |
| C5 | 100[7] | | 0 | | 0 | — | 0 | 1.6[10] |
| C6 | 100[7] | | 0 | | 0 | — | 81 | 4.64 |
| C7 | 100[8] | | 0 | | 0 | — | 0 | 2.1 |
| C8 | 100[8] | | 0 | | 0 | — | 79 | 3.68 |
|    |        |   |   |   |   |   |   | 4.06[9] |
| C9 | 100[8] | | 0 | | 0 | — | 100 | 9.761 |

[1]All examples used a copolymer of hexamethylenediamine with 30% terephthalic acid and 70% isophthalic acid, IV 0.82, except as noted.
[2]Types of EVOH: A: A vinyl alcohol copolymer containing 32 mole % ethylene, melting point 181°C., melt index = 1.3 to 4.4 (ASTM D-1238), density, 1.19 g/cc. B: A vinyl alcohol copolymer with 29 mole % ethylene, melting point 189° C., melt flow at 210° C. = 3 to 7 ASTM D-1238), density 1.21 g/cc.
[3]Types of additives: A: gamma-aminopropyl triethoxy silane B: Nylon 66/6 - a copolymer of 85 parts 66 nylon and 15 parts 6 nylon, relative viscosity = 55, melting point = 225° C.
[4]1 mil = 0.0254 mm.
[5]Oxygen Permeation Value in cc-mm/m$^2$-24 hr-atm at 30° C. (Original data measured in units of cc-mil/100 in$^2$-24 hr-atm, converted by multiplying by 0.3937.)
[6]The polyamide used was a tetrapolymer of 86 parts by weight of units of polymer from hexamethylene diamine and isophthalic acid, 29 parts by weight from hexamethylene diamine and terephthalic acid, 2 parts by weight from bis(4-aminocyclohexyl)methane and isophthalic acid, and 1 part by weight bis(4-aminocyclohexyl)methane and terephthalic acid, IV = 0.75.
[7]The polyamide used was nylon 6, m.p. 228° C.
[8]The polyamide used was nylon 66, relative viscosity 55, m.p. 269° C.
[9]Duplicate measurements.
[10]Measured at 23° C.

IV 0.73 was used. The compositions of Examples 27–33 were prepared by blending on a 53 mm twin screw extruder using a screw configuration with low shear mixing at 45 kg/hour for the unfilled resin blends and 54 kg/hour for the blends filled with mica. At these extrusion rates melt temperatures of about 245° C. were attained. The compositions of the Examples 22–26, 43, and 44 were prepared by blending ingredients on a 30 mm twin screw extruder under comparable conditions. The compositions of Examples 30–43 and Examples 46–49 were prepared by using a small batch mixer. Films were prepared either by extrusion from a flat die or by melt pressing; little or no difference in properties was observed between the two processes. OPV measurements were made at relative humidity of about 80 percent, and are reported in Table III (in the same units as in Table I).

It can be seen from the results that the addition of mica results in an improvement in the OPV by about a factor of two. Addition of talc resulted in somewhat less improvement. The use of polyvinyl alcohol with plasticizer provided a film with an unexceptional barrier without mica, but the addition of mica provided an improved barrier.

TABLE III

| Ex. | Polyamide: % | EVOH[1]: Type | % | Add've: Type | % | Thick. mils | OPV[2] 80% RH |
|---|---|---|---|---|---|---|---|
| 22 | 65 | A | 35 | | 0 | 3.38 | 0.37 |
| 23 | " | A | " | | " | 1.39 | 0.35 |
| 24 | 53 | A | 29 | Mica, | 18 | 4.98 | 0.13 |
| 25 | " | A | " | " | " | 2.12 | 0.20 |
| 26 | " | A | " | " | " | 2.71 | 0.18 |
| 27 | 65 | A | 35 | | 0 | 3.85 | 0.23 |
| 28 | " | A | " | | " | 0.67 | 0.26 |
| 29 | " | A | " | " | " | 1.15 | 0.17 |
| 30 | 57 | A | 30 | Mica, | 13 | 2.23 | 0.14 |
| 31 | " | A | " | " | " | 3.79 | 0.15 |
| 32 | " | A | " | " | " | 3.72 | 0.13 |
| 33 | " | A | " | " | " | 0.76 | 0.14 |
| 34 | 60 | A | 20 | " | 20 | 4.31 | 0.34 |
| 35 | 68 | A | 12 | " | " | 3.36 | 0.21 |
| 36 | 50 | C | 50 | | 0 | 3.93 | 0.29 |
| 37 | 56 | C | 24 | Mica | 20 | 6.30 | 0.09 |
| 38 | 65 | B | 35 | | 0 | 3.74 | 0.30 |
| 39 | " | B | " | | " | 6.33 | 0.21 |
| 40 | 52 | B | 28 | Mica | 20 | 3.03 | 0.13 |
| 41 | 65 | D | 35 | | 0 | 3.40 | 0.25 |
| 42 | 56 | A | 24 | Talc | 20 | 4.34 | 0.24 |
| 43 | 64 | A | 16 | " | 20 | 3.88 | 0.28 |
| 44 | 55 | A | 15 | Mica | 15 | 3.05 | 0.14 |
| 45 | 57 | A | 13 | Mica | 13 | 4.31 | 0.14 |
| 46 | 79 | PVOH | 27 | TEG | 3 | 5.35 | 0.48 |
| 47 | 69 | PVOH | 30 | " | 1 | 2.47 | 0.45 |
| 48 | 55 | PVOH | 24 | TEG | 1 | | |
| | | | | Mica | 20 | 3.18 | 0.20 |
| 49 | 55 | PVOH | 23 | TEG | 2.4 | | |
| | | | | Mica | 20 | 5.68 | 0.09 |

[1] EVOH types A and B are the same as in Table I. C is a copolymer containing 44 mol % ethylene. D is a copolymer containing 38 mol % ethylene. PVA is polyvinyl alcohol, used with triethylene glycol (TEG) plasticizer as an additive.
[2] in cc-mm/m$^2$-24 hr-atm, measured at 30° C.

Example 50 and Comparative Examples C10 and C11, in Table IV, prepared with the same materials as Example 30, show that the OPV of a film of 100% EVOH increases by a factor of 20 or more when the relative humidity is increased from 80 to about 97%. Even when 15% amorphous polyamide is blended in with the EVOH, the OPV increases under these conditions by a factor of 9, to give an unacceptably high value. When a blend within the scope of the present invention is used, however, the increase is only a factor of 3, resulting in an acceptable OPV even at 97% relative humidity.

TABLE IV

| | Composition, % | | | OPV[1] at 30° C. | | |
|---|---|---|---|---|---|---|
| Ex. | Polyamide | EVOH | Mica | 80% RH | 90% RH | ca.97% RH |
| C 10 | 0 | 100 | 0 | 0.07 | 0.19 | 1.60 |
| C 11 | 15 | 85 | 0 | 0.12 | 0.22 | 1.08 |
| 50 | 57 | 30 | 13 | 0.14 | 0.17 | 0.44 |

[1] cc-mm/m$^2$-24hr-atm

I claim:

1. A blend consisting essentially of about 50 to about 95 weight percent of an amorphous polyamide having a glass transition temperature of about 90° C. to about 200° C.; and about 5 to about 50 weight percent of a vinyl alcohol polymer having a copolymerized ethylene content of 0 to about 60 mol percent and a degree of saponification of at least about 90%, the percentages of the polyamide and vinyl alcohol polymers being based on the total weight of polymers in the blend.

2. The blend of claim 1 wherein the vinyl alcohol polymer is an ethylene vinyl alcohol copolymer having a copolymerized ethylene content of about 20 to about 60 mole percent.

3. The blend of claim 1 wherein the vinyl alcohol polymer is polyvinyl alcohol containing a plasticizer in an amount sufficient to provide melt processability.

4. The blend of claim 2 wherein the amorphous polyamide is present in an amount of about 55 to about 80 weight percent, and the ethylene vinyl alcohol copolymer is present in an amount of about 20 to about 45 weight percent.

5. The blend of claim 4 wherein the amorphous polyamide is present in an amount of about 60 to about 75 weight percent, and the ethylene vinyl alcohol copolymer is present in an amount of about 25 to about 40 weight percent.

6. The blend of claim 1 wherein the amorphous polyamide has a glass transition temperature of about 100° C. to about 165° C.

7. The blend of claim 1 wherein the amorphous polyamide is selected from the group consisting of hexamethylenediamine isophthalamide/terephthalamide copolymer having isophthalamide/terephthalamide moiety ratios of 100/0 to 60/40; mixtures of 2,2,4- and 2,4,4-trimethylhexamethylenediamine terephthalamide; and copolymers of hexamethylene diamine and 2-methylpentamethylenediamine with iso- or terephthalic acids, or mixtures of iso- and terephthalic acids.

8. The blend of claim 7 wherein the amorphous polyamide is a copolymer of hexamethylenediamine, 2-methylpentamethylenediamine and iso- and terephthalic acids having isophthalic/terephthalic moiety ratios of 100/0 to 15/85.

9. The blend of claim 8 wherein the amorphous polyamide is present in an amount of about 60 to about 75 weight percent, and the vinyl alcohol polymer is present in an amount of about 25 to about 40 weight percent.

10. The blend of claim 2 wherein the ethylene vinyl alcohol copolymer has a copolymerized ethylene content of about 25 to about 40 mole percent.

11. The blend of claim 10 wherein the degree of saponification of the ethylene vinyl alcohol copolymer is at least about 95%.

12. A film made from the blend of claim 1.

13. A film made from the blend of claim 7.

14. A film made from the blend of claim 9.

* * * * *